United States Patent Office 3,329,505
Patented July 4, 1967

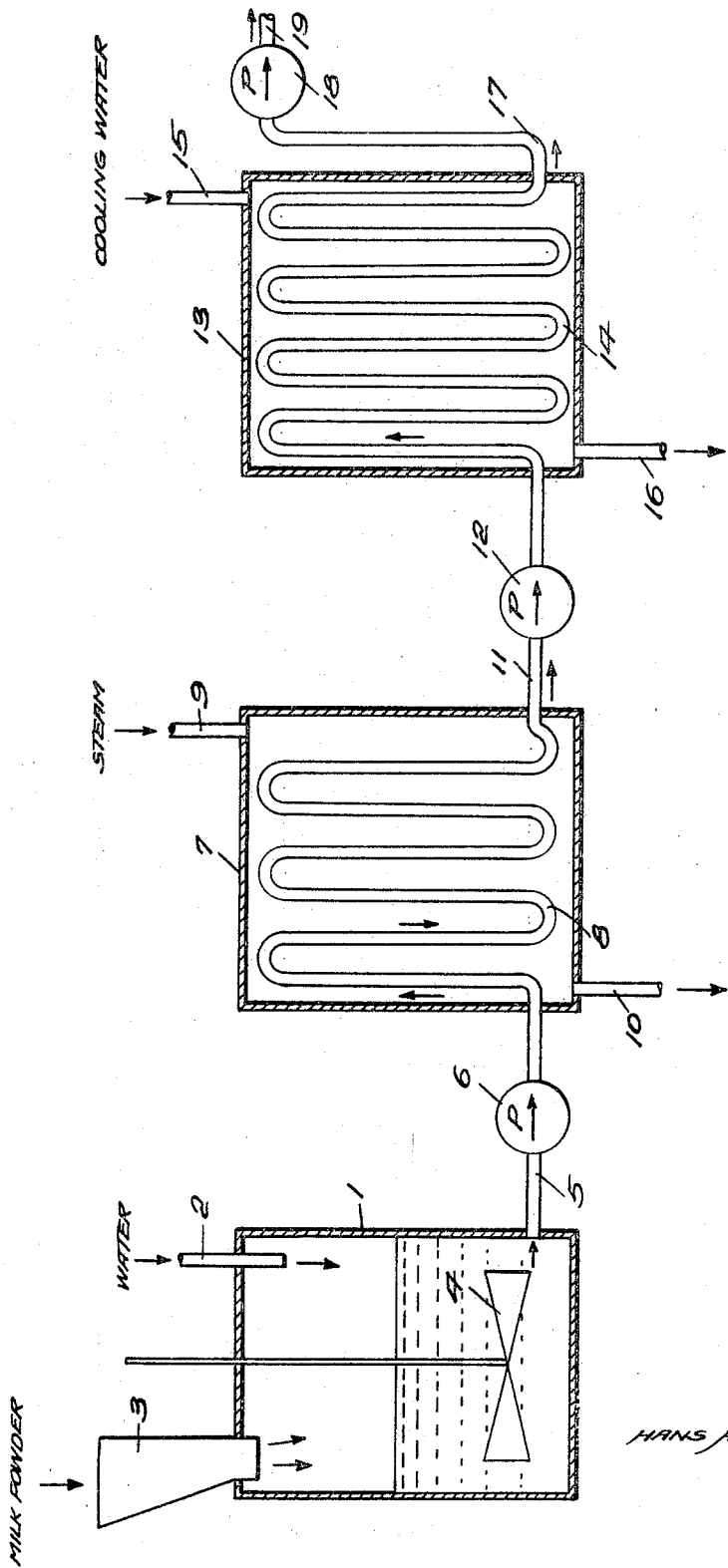
INVENTOR.
HANS ANDERS RAUSING,

3,329,505
METHOD OF IMPROVING THE FLAVOR OF MILK RECONSTITUTED FROM OXIDIZED MILK POWDER
Hans Anders Rausing, Lund, Sweden, assignor to AB Tetra Pak, Lund, Sweden, a Swedish company
Filed Oct. 28, 1966, Ser. No. 590,404
Claims priority, application Sweden, Apr. 1, 1963, 3,555/63
3 Claims. (Cl. 99—63)

This application is a continuation-in-part of my application Ser. No. 355,068 filed Mar. 26, 1964, now abandoned.

The present invention relates to a method of improving the flavor qualities of milk reconstituted from oxidized milk powder.

Milk powder, which is a very finely powdered product, will easily oxidize when exposed to the oxygen of the air. The reason for this is firstly that the milk powder contains some easily oxidized components and secondly that owing to its finely powdered condition it has a very large surface exposed to the oxygen. The milk powder, which through mixing with water may be reconstituted into milk, is an important complement to fresh milk, as the milk powder may be stored for a relatively long period and will, during storage, retain most of the important food substances of the milk.

Oxidized milk powder may, as is well known, be produced by spray or foam drying milk in contact with air and/or storing milk powder in contact with air. The degree of oxidation of the milk powder depends to some extent on the method of drying but more upon the method of storing it, i.e. the temperature and the tightness of the storage container.

A disadvantage attached to the milk powder is, as indicated above, that it oxidizes relatively easily, resulting in a considerable flavor deterioration of the milk which is reconstituted from the milk powder. This deterioration in quality of the milk powder caused by oxidation may be diminished and sometimes entirely eliminated through a treatment in accordance with the present invention, which is characterized therein that the milk powder when mixed with water is subjected to such heat treatment as would normally lead to a denaturation of the proteins in the milk, whereby the reconstituted milk will have a better flavor than would be the case if no heat treatment was applied.

It is a known fact that the proteins in the milk will denaturate in heat treatment whereby hydrogen sulphide combinations are formed, i.e. substances containing so-called SH-groups which have the property of being very reducing. These denaturation products give the heat treated milk an unpleasant boiled taste which is particularly noticeable when the milk is heat treated at high temperature and during a long period, as the quantity of denaturation products formed in heat treatment is dependent on the temperature used as well as the period of treatment. It is also known that the flavor deteriorating effect of these denaturation products may be neutralized if the milk which contains denaturation products (in this case hydrogen sulphide combinations) is exposed to the oxidizing effect of the oxygen in the air, or in other ways is brought into contact with oxygen.

In those cases where the milk has been reconstituted from an oxidized milk powder a certain amount of oxygen is already chemically bound to the milk powder, wherefor the highly reducing SH-groups formed in the milk during heat treatment of the reconstituted milk will react with and reduce the oxygen chemically bound in the milk. As the oxidation products in the milk powder and the denaturation products in the heat treated milk, each separately being flavor deteriorating, easily may be made to react chemically with each other and thereby to neutralize each other, the heat treated milk may be rendered relatively free from flavor deteriorating substances. The ideal position will of course occur when the amounts of oxidation products and denaturation products are so balanced in relation to each other that they will both be completely neutralized in the chemical reaction, whereby accordingly no flavor deteriorating substances will be left.

The necessary heat treatment may at the same time serve other purposes than to improve the flavor of the reconstituted milk. Thus it is usual to subject the milk to heat treatment, known as pasteurizing, in order to destroy certain bacteria present in the milk, or also to effect a complete sterilizing of the milk which in that case, after heat treatment under aseptic conditions, may be packed in aseptic packages.

In order to achieve the best possible result when applying the invention, the degree of oxidation of the milk powder should first be determined by analysis to enable a calculation of the treatment temperature and the period required for the heat treatment.

If after the heat treatment the milk is going to be packed one may choose a packaging material which to a certain degree is permeable to oxygen molecules present in the air, but on the other hand not to bacteria. Such packaging materials are in reality known and among these are certain plastic films, for instance polyethylene film. As the oxygen permeability of the packaging material depends, apart from purely physical conditions, on the area of the package walls as well as the thickness of the packaging material, the package may be so dimensioned that the denaturation products remaining after the heat treatment after a certain set period will be neutralized by the oxygen permeating through the wall of the package.

As will be seen from the above it is possible with the hereindescribed method to obtain, on the basis of a milk powder affected by oxidation and therefore inferior in quality, a high quality reconstituted milk which, if so desired, at the same time will be sterilized.

The method has a considerable practical importance as the milk powder is a very valuable food, but very sensitive to oxidation. Thus it is possible, through a procedure in accordance with the invention, to make use of large stocks of oxidation affected dried milk which otherwise would be unfit for consumption.

The invention is more fully described and illustrated by the following specific example taken with the accompanying drawing which is a diagrammatic showing of an apparatus which is suitable for the performance of the method of the invention. Referring to the drawing 1 is a cylindrical container, 2 is a pipe for the introduction of water into the container, 3 is a funnel for the introduction of milk powder into the container, 4 is a stirrer, 5 is a valved conduit leading from the container 1 to the pump 6 which delivers into the heating coil 8 of the heater 7 having an inlet and outlet 9 and 10 for steam, 11 is a conduit leading from the coil 8 to a pump 12 which in turn delivers the milk to the coil 14 in the cooler 13 which has inlet and outlet pipes 15 and 16 for cooling water and 17 is a conduit leading to the pump 18 and delivery pipe 19 through which the milk is delivered to the packaging plant (not shown).

The degree of oxidation of the milk powder (the content of peroxides) can be determined by analysis such as the so-called TBA test and the amount of SH-groups formed during the heat treatment also may be determined by known analytical methods. Further the rate of formation of SH-groups during heating at a particular temperature can be determined. Thus one might determine the degree of oxidation of the milk and then determine the time and temperature of heating required to obtain a product free of the objectionable taste or flavor resulting from either oxidation or denaturation in accordance with the equation

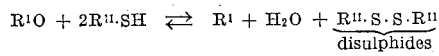

where $R^1$ is a radical representing the milk powder and $R^{11}$ is a radical formed when the albumen in the milk is denaturated. During the denaturation process the radical $R^{11}$ is linked with a SH-group which gives the milk a cooked flavor. The reaction is reversible, and the oxidized radical $R^1O$ reacts with two molecules of the radical $R^{11}$ linked with SH-groups. This reaction results in a free radical $R^1$ and water and disulphides containing the radical $R^{11}$. The disulphides formed have practically no taste, and they are quite harmless.

However the above described procedure i.e. analysis for peroxides in the milk powder and the provision of a table showing the amounts of SH-groups formed at a given temperature e.g. 120° C. in different periods of time and then a calculated heating of the milk powder to neutralize the oxidized taste is too complex and time consuming for commercial use when, as has been determined by experience the desired and point readily can be determined by a simple taste test.

*Example*

Milk powder produced by spray drying and after storage for 6 months in contact with air and having a water content of about 3%, said milk powder, when reconstituted with water, having a distinct stale flavor, was mixed with about 9% of water at a temperature of 50–60° C. in the container 1 of the apparatus described above. The resulting reconstituted milk was then passed through the heater 7 where it was heated to 120° C. The time required for the passage of the milk through the coil was about one minute. The milk was then passed through the cooler 13 and tasted and was found to be free of the stale flavor due to oxidation and also free of the boiled taste which is characteristic of the presence of SH-groups. It was then stored in air tight containers.

It will be appreciated that in the treatment of large batches of milk powder the heating conditions required for a tasteless product can be established at the beginning by increasing or decreasing the heating time (and/or temperature) until the desired taste is obtained and then continuing the treatment of the batch (assuming a uniform composition) at the determined time and temperature.

I claim:
1. Method of improving the flavor qualities of milk which has been reconstituted from an oxidized milk powder which has a distinct stale flavor which comprises subjecting the reconstituted oxidized milk to at least a pasteurizing heat treatment whereby at least a part of the oxygen that is chemically bound in the milk is caused to react with at least a part of the denaturation products produced by said heat treatment.
2. Method as defined in claim 1 in which said reconstituted oxidized milk powder is subjected to a sterilizing heat treatment.
3. Method as defined in claim 1 in which the reconstituted oxidized milk powder, after said heat treatment is stored in a container that is permeable to oxygen but impermeable to bacteria.

No references cited.

A. LOUIS MONACELL, *Primary Examiner.*

S. E. HEYMAN, *Assistant Examiner.*